G. W. DAVIS.
CULTIVATOR.
APPLICATION FILED JULY 29, 1909.
974,241.
Patented Nov. 1, 1910.
2 SHEETS—SHEET 1.
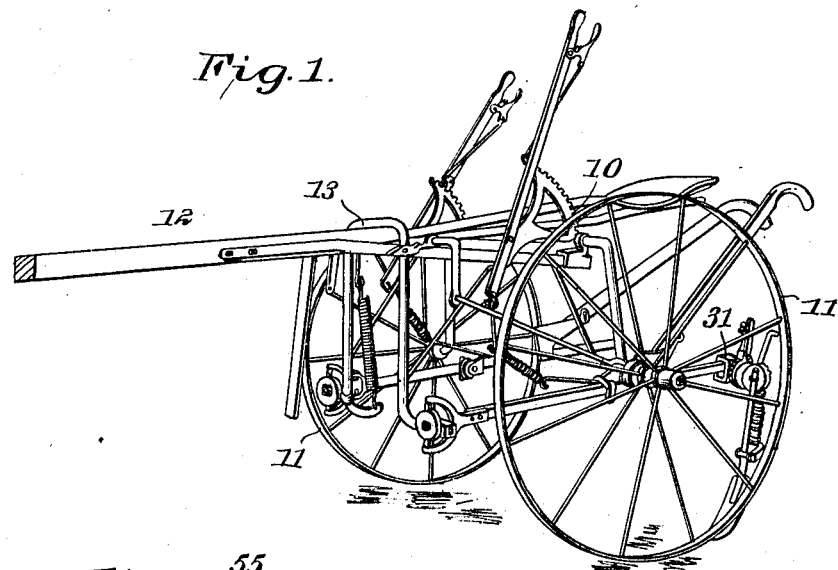
Fig. 1.
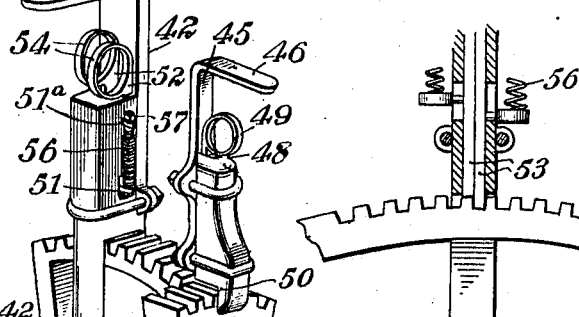
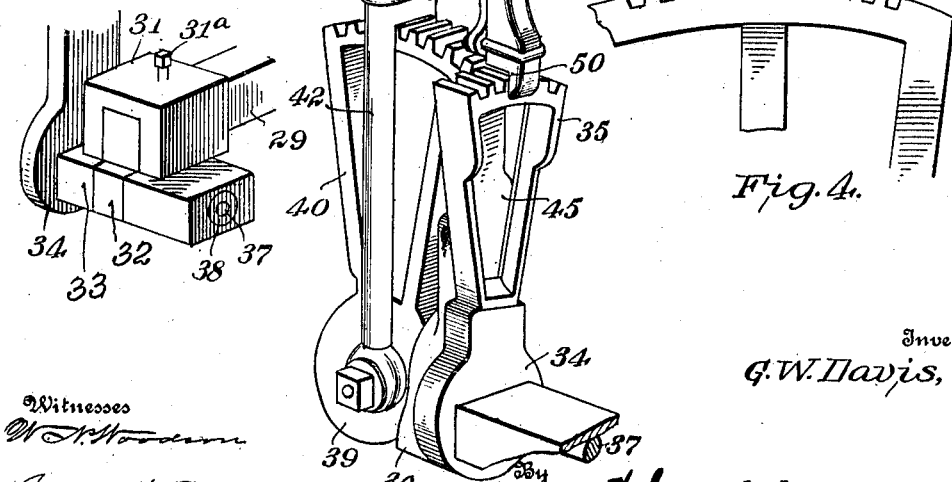
Witnesses
Inventor
G. W. Davis,
By
Attorneys.

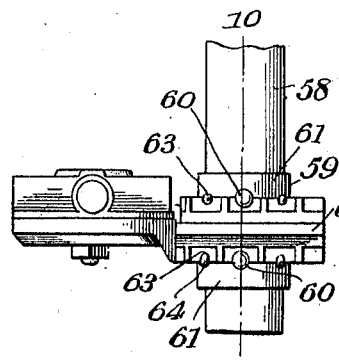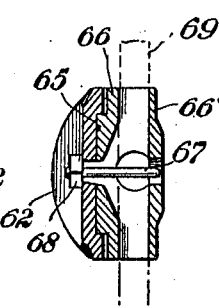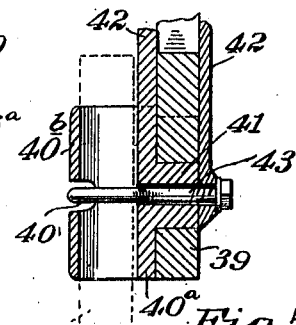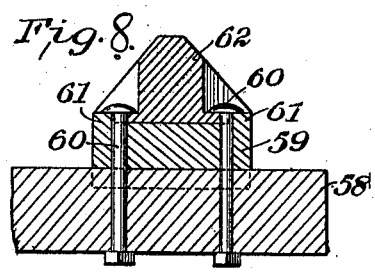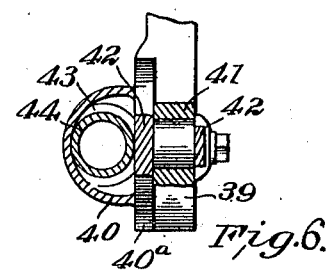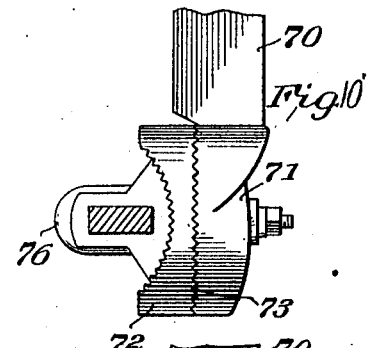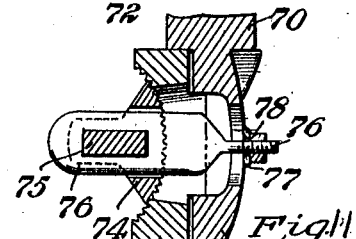

UNITED STATES PATENT OFFICE.

GEORGE W. DAVIS, OF BLOSSOM, TEXAS.

CULTIVATOR.

974,241.  Specification of Letters Patent.  Patented Nov. 1, 1910.

Application filed July 29, 1909. Serial No. 510,283.

*To all whom it may concern:*

Be it known that I, GEORGE W. DAVIS, citizen of the United States, residing at Blossom, in the county of Lamar and State of Texas, have invented certain new and useful Improvements in Cultivators, of which the following is a specification.

This invention relates to cultivators, and has particular reference to an improved means for adjusting the shovel standards carried thereby.

An object of this invention is to provide means for securing the shovel standards at various angles both forwardly and laterally so as to enable the accurate positioning of the shovels with respect to the ground.

Another object of this invention is to so construct a shovel support as to permit of the adjustment of the shovel into any desired angle or height, and in forming a head of peculiar construction which will admit of such universal adjustment and will retain the shovel rigidly in such position by the employment of but one clamping bolt.

The invention further contemplates a novel construction of head or connection between the shovel beams and the forward arched bar of the cultivator whereby the beams are rigidly retained upon the bar and all lost motion or play between the bar and the beams is taken up and eliminated.

The invention has for a still further object the production of a cultivator, the parts of which are so formed as to admit of the attachment of shovels and the like which are of common formation, thereby producing a cultivator which may be generally used and one which is adapted to work under practically any conditions.

For a full understanding of the invention and the merits thereof, reference is to be had to the following description, and accompanying drawings, in which:

Figure 1 is a perspective view of a cultivator having the improved attachments applied thereto; Fig. 2 is a detail perspective view of the standard head or connection of the beam to the cultivator; Fig. 3 is a detail view of the connection of the head to the shovel beam; Fig. 4 is a detail fragmentary view of the head disclosed partly in section and showing the double pawl mechanism for the fine adjustment of the standard; Fig. 5 is a vertical fragmentary sectional view through the head disclosed in Fig. 2, showing in dotted lines the shovel standard; Fig. 6 is a longitudinal section through the same; Fig. 7 is a top plan view of a modified form of plow standard support, showing a fragmentary view of the plow beam which supports the standard; Fig. 8 is a longitudinal section through the plow beam and standard support on the line 10—10 of Fig. 9; Fig. 9 is a vertical section taken transversely through the standard block disclosed in Fig. 6; Fig. 10 is a top plan view of a second modification of the standard support showing a standard of rectangular formation engaged through the same, and Fig. 11 is a horizontal section through the same.

Corresponding and like parts are referred to in the following description, and indicated in all the views of the accompanying drawings, by the same reference characters.

In the drawings, the numeral 10 designates a cultivator frame upon which the wheels 11 are mounted for supporting the same, and which is provided with a forwardly extended tongue 12 and a depending arched bar 13. Upon each extremity of the arched bar 13 is suitably mounted a shovel beam 29.

The rear end of each of the shovel beams 29 is squared for the insertion thereof into a channel member 31 which is rigidly engaged upon the beam 29 in any suitable manner, as by a set screw 31ª, and which is integrally formed with a rectangular sleeve 32 which carries a shank 33. The shank 33 extends outwardly from the rectangular sleeve 32 and carries a disk 34 which is positioned at right angles to the same, the disk 34 being provided at its upper edge with a rack or segment 35. Engaged against the outer face of the disk 34 is a second disk 36 which is secured thereto by the provision of a bolt 37, the head of which is abutted against the outer face of the second disk 36 and which has its shank engaged through the disk 34 and shank 33 which passes through the sleeve 32, the extremity of the bolt being provided with a clamping nut 38. The disk 36 carries a circular head 39 which is formed with a rack 40 extending upwardly from the same, the head 39 being secured centrally upon the disk 36 and extended at right angles outwardly from the same. Clamped against the forward face of the head 39 is a circular plate 40ª which is provided with a boss 41 which engages into an aperture formed centrally in the head 39 in order to retain the circular plate 40ᵃ in concentric relation thereto, and to admit of the rotation of the same. The circular plate 40ᵃ is provided on its inner face with a lateral depression or groove into which is embedded one arm of a fork hand lever 42 which extends upwardly therefrom for the purpose of rotating the circular plate 40ᵃ relative to the head 39. The opposite arm of the hand lever 42 extends against the outer face of the plate 39 and is abutted against the outer end of the boss 41. The plate 40ᵃ is provided with an integral sleeve 40ᵇ through which a standard 44 is engaged and which is formed with a transverse slot 40ᶜ for the reception of the eye of an eye bolt 43. The eye bolt 43 is seceured through the head 39 and circular plate 40ᵃ the eye of which terminates in the forward face of the circular plate 40ᵃ and engages the upper end of the shovel or plow standard 44. The circular plate 40ᵃ thereby acts as a standard head in supporting the standard in the desired angle according to the rotation of the circular plate 40ᵃ. The disk 36 is like wise provided with an upwardly projected handle 45 which carries an overturned or hand engaging portion 46 and which carries intermediately a housing 47 in which is disposed a reach rod 48. The reach rod 48 is provided with a finger loop 49 at its upper extremity which is positioned directly beneath the hand engaging portion 46 and carries at its lower extremity a pawl 50 which engages with the teeth of the segment 35. The pawl 50 is positioned in the lower end of the housing to admit of the accurate adjustment of the disk 36, and the lever 42 in like manner is provided with a housing in which are mounted reach rods 52 which are abruptly terminated at their lower extremities to form pawls 53 which engage with the segment 40, the rods 52 being provided with finger loops 54 at their upper ends disposed immediately beneath the turned over hand engaging portion 55 formed upon the upper end of the lever 42. Each of the reach rods 52 are provided with expanding springs 56 for depressing the reach rods 52 and are disposed between the projections 51 and 51ᵃ carried on the reach rods 48 and the housing on the lever 42 respectively, and are retained from lateral play by sliding bolts 57.

In the modification of the device as is disclosed in Figs. 6, 7, and 8, the shovel beam 58 is provided with a guide 59 which is clamped thereagainst by means of a pair of bolts 60. The guide 59 is concaved at its under face to conform to the curvature of the shovel beam 58 and is adapted to fit snugly thereagainst when the clamping bolts 60 are applied thereto. The guide 59 is provided at its opposite ends with upwardly projected flanges 61, between which is slidably disposed a T-bar 62. The T-bar 62 is provided with series of equi-distantly spaced and registered notches 63 in the opposite edges of the flanges of the same which engage loosely against the inner faces of the flanges 61 and register with notches 64 formed in the inner edges of the flanges 61 for the reception of the clamping bolts 60 therethrough. By this formation it is readily observed that the clamping bolts 60 engage partly in the notches 64 and partly in the notches 63, the heads of the bolts 60 being engaged upon the upper faces of the flanges 61 and the T-bar 62 which thereby prevents the longitudinal movement of the T-bar and the withdrawal of the same. The outer end of the T-bar 62 carries a circular head 65 which is serrated on its forward face to engage with a circular plate 66 which carries a serrated face to engage the serrations formed upon the head 65. An eye bolt 67 is engaged centrally through the circular plate 66 and the head 65 and clamps the same together under the action of a nut 68. A plow standard 69 is engaged through the eye-bolt 67 and secures the same against the forward face of the circular plate 66. The plate 66 is provided with a double sleeve 66ᵃ having passages at right angles therethrough, against the forward face of the same into which the standard 69 is fitted and retained from movement relative to the same by the eye-bolt 67. The bolt 67 engages through slots formed in the sleeve 66ᵃ at right angles to each other.

In the modification disclosed in Figs. 10 and 11 a bar 70 is disclosed which is carried upon the shovel beams and which carries a hollow disk 71 to which is secured a second disk 72. The disk 71 is provided with an inner arcuate and serrated face 73 which abuts an arcuate and serrated face formed upon the inner side of the disk 72 to permit of the angular adjustment of the disk 72 from the plane of the disk 71. A sleeve member 74 is engaged against the outer face of the second disk 72 and is provided with an inner arcuate and serrated face for engagement with an outer serrated and curved face of the disk 72 which is arranged at right angles to the face 73 on the disk 71. This arrangement permits of the angular adjustment of the standard 75 which is engaged through the sleeve member 74 and also of the partial rotation of the same. The members 74 and the disks 71 and 72 are clamped in adjusted position by means of an eye bolt 76 which is engaged about the standard 75, and through the disks 71 and 72 and the member 74. The outer face of the disk 71 is curved to accommodate a washer 77 which is retained against the same and upon the outer end of the eye bolt 76 by a clamping nut 78. A slot 79 is formed in the disk 71 to permit of the swinging of the bolt 76 to various angles during adjustment. This arrangement is for use with rectangular standards to permit of the rotatable adjustment of the same.

When it is desired to adjust the plow standard 44 into various angles the operator grasps the levers 42 and 45 and vibrates the same. Before the movement of the levers 42 and 45 the pawls 50 and 53 are first released from the segments 35 and 40. It is readily seen that if one of the pawls 53 drop into the space between two of the teeth 35 that the remaining pawl will rest upon the upper face of the adjacent tooth and will only engage between the teeth upon the further movement of the lever 45 a distance of the thickness of the tooth. This provision of the two pawls 53 insures a fine adjustment of the standard 44. The disk when adjusted positions the standard 44 in the desired forward angle while the circuit plate 40$^a$ when adjusted positions the standard 44 in the desired transverse or lateral angle. This minute adjusting enables the operator to position the shovels at the desired angle and in the desired distance apart so as to register with rows or the like during the operation of the machine.

The modified form discloses a construction which although capable of being released and secured laterally, still is adaptable chiefly when the standards are permanently adjusted in position.

Having thus described the invention, what is claimed as new is;

1. In a cultivator, the combination with a body portion, of a bar carried by said body portion, a hollow disk mounted on said bar, and having an inner serrated face, a second disk engaged against said first disk and having a corresponding serrated face, a sleeve member positioned against the outer face of said second disk, said second disk and said sleeve member having corresponding curved and serrated faces arranged at right angles to said first serrated faces, a standard engaged through said sleeve members, a bolt engaged about said standard and through said disks, said first disk having a longitudinal slot formed through the outer wall thereof, the outer face of said first disk being curved, and a washer carried by said bolt for slidable engagement through the curved faces of said first disk.

2. In a cultivator, the combination with a body portion, of a shovel beam located thereon, a disk carried by said shovel beam, a second disk rotatably disposed against said first disk, a sleeve member arranged against said second disk a standard carried by said sleeve member, a hand lever mounted upon said second disk, a rack disposed on said first disk and adapted for coöperation with said hand lever, a pair of plates carried by said hand lever, adapted for independent operation, said plates adapted to engage alternately upon the upper edges and between the teeth of said rack to permit of the fine adjustment of the angle of said standard, and means connected to said plates for withdrawing the same independently from said rack.

3. A cultivator including a bar, a hollow disk mounted on said bar and having a serrated face, a second disk engaged against said first disk and having a correspondingly serrated face, a sleeve member positioned against said second disk, said second disk and said sleeve member having interfitting curved and serrated faces, a standard carried through said sleeve member, and means carried by said disks and said sleeve member for clamping said standard and said disks rigidly in adjusted position.

4. A cultivator including a bar having a disk formed upon one end thereof with a flattened and serrated face, a second disk engaged against said first disk and having a correspondingly formed flattened face for interlocking engagement therewith, said second disk also having an outer concaved and serrated face, a sleeve member engaged against said second disk and having a convexed and serrated face for locking engagement with said second disk, a standard arranged through said sleeve member at right angles to said disks, and means engaged with said standard and said disk for clamping the same rigidly in various planes relative to one another.

5. A cultivator including a bar, a disk carried on said bar and having a serrated face, a second disk disposed against said first disk and having a correspondingly formed serrated face, said second disk also having a curved and serrated opposite face, a sleeve member engaged against the curved face of said second disk, a standard carried through said sleeve member and means for clamping said disks and said sleeve member together at various angles.

In testimony whereof I affix my signature in presence of two witnesses.

GEORGE W. DAVIS. [L. S.]

Witnesses:
C. W. ARCHER,
E. D. CASTLEBURY.